(12) United States Patent
Huang et al.

(10) Patent No.: US 11,594,913 B2
(45) Date of Patent: Feb. 28, 2023

(54) WIRELESS CHARGING HOLDER FOR VEHICLES

(71) Applicant: JOWUA INTERNATIONAL LIMITED, Edwin Wallace Rey Drive (AI)

(72) Inventors: Cheng-Su Huang, Taipei (TW); Cheng-Wen Huang, Kaohsiung (TW)

(73) Assignee: JOWUA INTERNATIONAL LIMITED, Edwin Wallace Rey Drive (AI)

( * ) Notice: Subject to any disclaimer, the term of this patent is extended or adjusted under 35 U.S.C. 154(b) by 210 days.

(21) Appl. No.: 17/123,216

(22) Filed: Dec. 16, 2020

(65) Prior Publication Data

US 2022/0190642 A1 Jun. 16, 2022

(51) Int. Cl.
*H02J 50/00* (2016.01)
*H02J 7/00* (2006.01)
*H02J 50/10* (2016.01)

(52) U.S. Cl.
CPC .......... *H02J 50/005* (2020.01); *H02J 7/0044* (2013.01); *H02J 50/10* (2016.02); *H02J 2207/30* (2020.01); *H02J 2310/22* (2020.01); *H02J 2310/40* (2020.01)

(58) Field of Classification Search
None
See application file for complete search history.

(56) References Cited

U.S. PATENT DOCUMENTS

2011/0148352 A1* 6/2011 Wang .................. B60R 11/0241
320/108

FOREIGN PATENT DOCUMENTS

| CN | 210101509 U | 2/2020 |
| CN | 210518471 U | 5/2020 |
| CN | 110816424 B | 10/2020 |

* cited by examiner

*Primary Examiner* — Arun C Williams
(74) *Attorney, Agent, or Firm* — WPAT, PC

(57) ABSTRACT

A wireless charging holder for vehicles, which is used to firmly clamp a mobile terminal and wirelessly charge the mobile terminal, comprises a fixing component, a supporting component, a steering joint and a conductive circuit. The fixing component is for fixing a mobile terminal and includes a wireless charging module for charging the mobile terminal. The supporting component is for supporting the fixing component. The steering joint is connected between the fixing component and the supporting component, thereby the fixing component may rotate relative to the supporting component. The conductive circuit is extending from an inside of the supporting component through an inside of the steering joint and into an inside of the fixing component, to connect with the wireless charging module.

10 Claims, 6 Drawing Sheets

WIRELESS CHARGING HOLDER FOR VEHICLES

FIELD OF THE DISCLOSURE

The present invention relates to a wireless charging holder for vehicles, and more particularly to a wireless charging holder for holding and charging a mobile terminal.

BACKGROUND

The development of technology has made various electronic products more intelligent, more functional, and easy to use. For example, the mobile phone nowadays is used as a mobile terminal, and people are increasingly dependent on it in their daily lives. Functions such as map navigation and voice control of mobile phones are used more and more frequently in daily travel, especially in driving environments.

In the driving environment, the user can charge the mobile phone through the power supply in the car. It is common to use a car phone holder to hold and charge the mobile phone. For the current car phone holder with wireless charging function, the charging cable interface is generally arranged on the housing of the clamping part of the phone holder, and an external charging cable is used to transfer the electrical power to the wireless charging device disposed in the clamping part. The clamping part is usually designed to be rotatable to meet the needs of consumers for adjusting the angle or direction of the clamped mobile phone. However, rotating the clamping part during the charging process easily causes the charging cable to be entangled on the clamping part, thereby affecting the use of the mobile phone and driving safety.

Therefore, how to develop a wireless charging device for vehicles that can hide the charging cable to prevent it from being entangled when charging the mobile phone and provide consumers the function of adjusting the angle or direction of the mobile phone freely, has become the issue that those skilled in the art want to actively solve.

SUMMARY

The purpose of the present invention is to provide a wireless charging holder for vehicles, which is used to firmly clamp a mobile terminal and wirelessly charge the mobile terminal. By arranging the charging circuit passing through the internal spaces of each component of the wireless charging holder, the problem of wire entanglement or the wire blocking the screen can be prevented when users rotating the mobile terminal to adjust its direction and angle.

In order to achieve at least one of the advantages or other advantages, one embodiment of the present invention provides a wireless charging holder for vehicles, comprising: a fixing component for fixing a mobile terminal, wherein the fixing component includes a wireless charging module for charging the mobile terminal; a supporting component for supporting the fixing component; a steering joint connected between the fixing component and the supporting component, thereby the fixing component may be rotated relative to the supporting component; and a conductive circuit extending from an inside of the supporting component through an inside of the steering joint and into an inside of the fixing component, to connect with the wireless charging module. And the steering joint has a through hole which communicate with the inside of the supporting component. And the steering joint has a protrusion disposed to limit the fixing component relative to the range of supporting component rotation.

In some embodiments, the steering joint includes a ball-end shaft and a socket.

In some embodiments, the ball-end shaft includes a ball body and a shaft, one end of the shaft is connected to the ball body, and the other end of the shaft is connected and fixed to the supporting component.

In some embodiments, the ball-end shaft has a through hole penetrating through the shaft and the ball body along an axis of the ball-end shaft to communicate with the inside of the supporting component.

In some embodiments, the socket has a cavity for accommodating the ball body and an opening is formed at a bottom of the cavity for communicating with the inside of the fixing component.

In some embodiments, the socket has a protrusion disposed on an inner surface of the cavity, and the ball body has a limiting member thereon for obstructing the protrusion, thereby to limit a range of rotation of the socket relative to the ball body.

In some embodiments, the fixing component is a magnetic fixing component for fixing the mobile terminal by magnetic attraction.

In some embodiments, the fixing component includes a clamping portion, and two ends of the clamping portion are respectively provided with a clamping member for clamping and fixing the mobile terminal.

In some embodiments, the supporting component has a transmission interface disposed in the inside thereof, one end of the conductive circuit is connected to the transmission interface and is connected to an external power source through the transmission interface.

In some embodiments, the transmission interface may be used to transmit power at least, and the transmission interface can be a USB interface, a Type-C interface, a lighting interface or a cigarette lighter interface.

In some embodiments, a housing of the supporting component has a hole, and one end of the conductive circuit extends in the supporting component and passes through the hole to connect to an external power source.

In some embodiments, the wireless charging holder for vehicles further comprises a suction base, which is connected to the supporting component through a pivoting member, thereby the supporting component can rotate relative to the suction base.

Accordingly, the wireless charging holder for vehicles provided by the present invention can firmly clamp a mobile terminal and wirelessly charge the mobile terminal. The charging circuit is hidden and integrated in the inner space of the wireless charging holder, thereby the problem of wire entanglement or blocking the screen can be prevented when the mobile terminal is adjusted in different directions or angles during charging.

The foregoing description is merely an overview of the technical solution of the present invention. In order to enable a clearer understanding of the technical means of the present invention, and thus it can be implemented in accordance with the teachings of the present invention, and to enable the above features and advantages of the present invention to be more clearly understood, the embodiments are described in detail with reference to the accompanying drawings.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
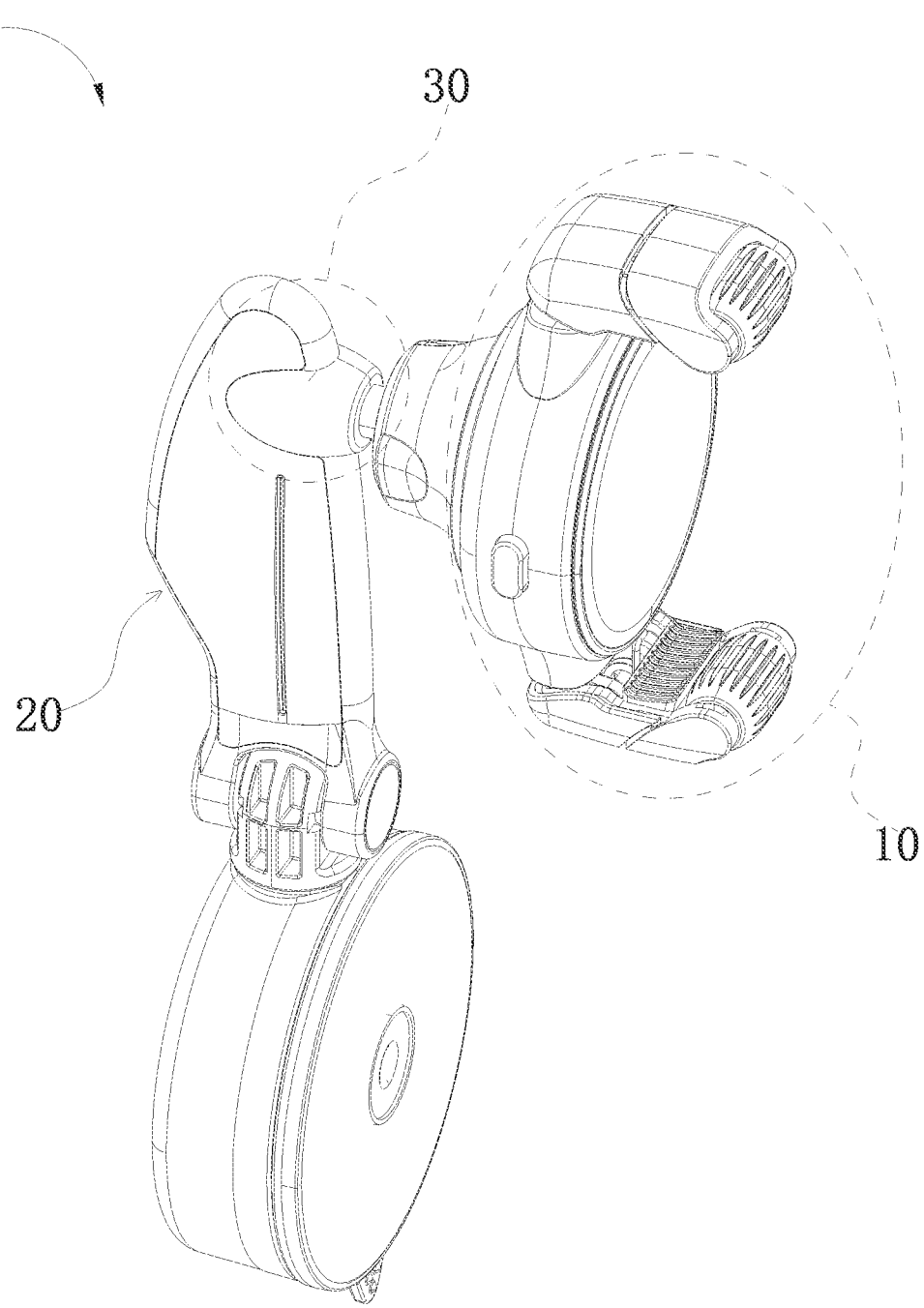
FIG. 1 is a schematic diagram of the wireless charging holder for vehicles of the present invention.

It should be noted, the embodiments illustrated herein are applied for explaining rather than limiting the present invention.

The specific structural and functional details disclosed herein are only representative and are intended for describing exemplary embodiments of the disclosure. However, the disclosure can be embodied in many forms of substitution and should not be interpreted as merely limited to the embodiments described herein.

In the description of the present invention, the terms for indicating orientations or positional relationships such as "center", "longitudinal direction", "above", "below", "left", "right", "vertical", "horizontal", "top", "bottom", "inside" and "outward" for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation with respect to the disclosure. In addition, the terms as "first" and "second" are used for describing purpose and cannot be interpreted as the instruction or hint about the importance nor be implied the quantity of characteristic elements. Thus, the feature limited with "first" or "second" may include one or more characteristic element. In description of the present invention, the implication of "multiple" is two or more unless otherwise indicated. Further, the terms "comprises," "comprising," or any other variation thereof, are intended to cover a non-exclusive inclusion.

In this invention, unless otherwise clearly defined and limited, the terms such as "installation", "being connected" and "connection" should be interpreted broadly, such as, can be fixedly connected with, also can be removably connected, or connected in one piece; and can be mechanically connected, also can be electrically connected; can be directly connected, also can be indirectly connected; can be connected by intermedia; can be the connection of two element internally. For the ordinary skilled in the art, the actual meaning of above-mentioned term in the present invention can be understood according to the specific situations.

The terms used herein are only for describing specific embodiments and are not intended to limit the exemplary embodiments. Unless the context clearly dictates otherwise, the singular forms such as "a" and "one" used herein are also intended to include the plural. It should also be understood that the terms "including" and/or "comprising" used herein specify the existence of the stated features, integers, steps, operations, units and/or components, and do not exclude the existence or addition of one or more other features, integers, steps, operations, units, components, and/or combinations thereof.

Figure 2:
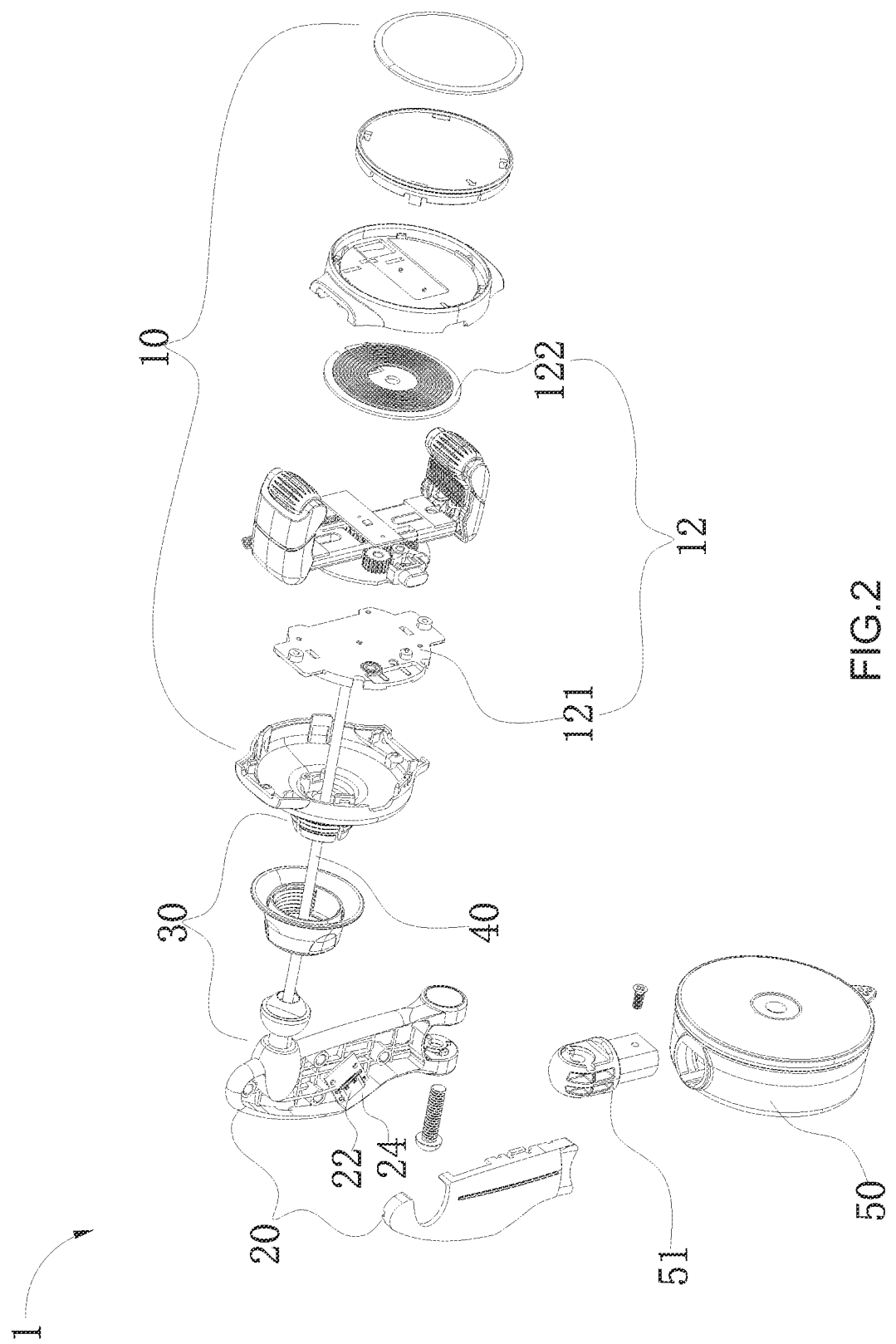
FIG. 2 is an exploded view of the wireless charging holder for vehicles in FIG. 1.

Please refer to FIG. 1 and FIG. 2. FIG. 1 is a schematic diagram of a wireless charging holder for vehicles provided in an embodiment of the present invention. FIG. 2 is an exploded view of the components of the wireless charging holder for vehicles. In order to achieve at least one of the advantages or other advantages, the wireless charging holder 1 for vehicles in one embodiment of the present invention comprises a fixing component 10, a supporting component 20, a steering joint 30 and a conductive circuit 40.

The fixing component 10 can be used to fix a mobile terminal to facilitate the driver to operate the mobile terminal during driving. The fixing component 10 includes a wireless charging module 12 for charging the mobile terminal. As shown in the figures, in one embodiment, the wireless charging module 12 includes at least a circuit board 121 and a charging disk 122. The mobile terminal is charged wirelessly by the charging disk 122.

The supporting component 20 is used to support the fixing component 10. The steering joint 30 is connected between the fixing component 10 and the supporting component 20 so that the fixing component 10 can be rotated relative to the supporting component 20 to adjust the angle or direction of the mobile terminal.

The conductive circuit 40 extends from the inside of the supporting component 20 through the inside of the steering joint 30 and into the inside of the fixing component 10, and then connects with the wireless charging module 12. That is, the conductive circuit 40 is arranged inside the wireless charging holder 1 for vehicles, and supplies power to the wireless charging module 12.

Figure 3:
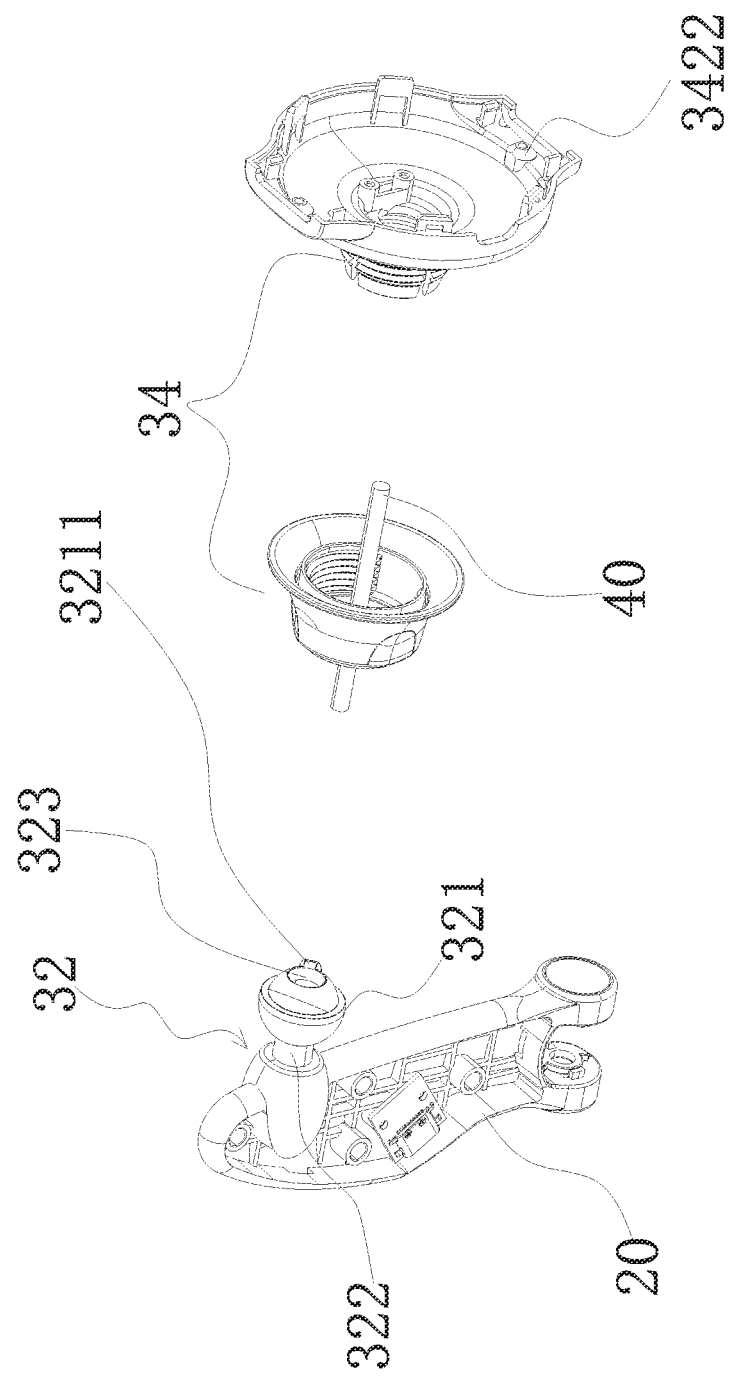
FIG. 3 is an exploded view of the steering joint of the present invention.

Referring to FIG. 3, in one embodiment, the steering joint 30 includes a ball-end shaft 32 and a socket 34. The socket 34 is fitted on the ball-end shaft 32 and can rotate relative to the ball-end shaft 32. The ball-end shaft 32 includes a ball body 321 and a shaft 322. One end of the shaft 322 is connected to the ball body 321, and the other end is connected and fixed to the supporting component 20. That is, the ball-end shaft 32 is connected and fixed to the supporting component 20 through the shaft 322.

The ball-end shaft 32 has a through hole 323. The through hole 323 penetrates the ball body 321 and the shaft 322 along the axial direction of the ball-end shaft 32 and communicates with the internal space of the supporting component 20. That is, the through hole 323 is along the direction of the shaft 322 and penetrates the shaft 322 and the ball body 321. In one embodiment, the shaft 322 is a tubular structure, the ball body 321 has a penetrating opening, and one end of the shaft 322 just connects to the opening of the ball body 321, thereby to form the through hole 323.

In one embodiment, the ball body 321 and the shaft 322 are formed in one piece and are connected and fixed to the supporting component 20. In another embodiment, the ball body 321, the shaft 322 and the supporting component 20 are formed in one piece. That is, when the housing of the supporting component 20 is made, the ball-end shaft 32 is simultaneously formed to protrude from one side of the supporting component 20 and communicating with the inner space thereof.

In one embodiment, as shown in the figures, the conductive circuit 40 may be a wire, which extends from the inner space of the supporting component 20 to the inner space of the fixing component 10 via the through hole 323, and is connected to the wireless charging module 12 disposed in the fixing component 10 for providing the electrical power to the charging disk 122.

Figure 4:
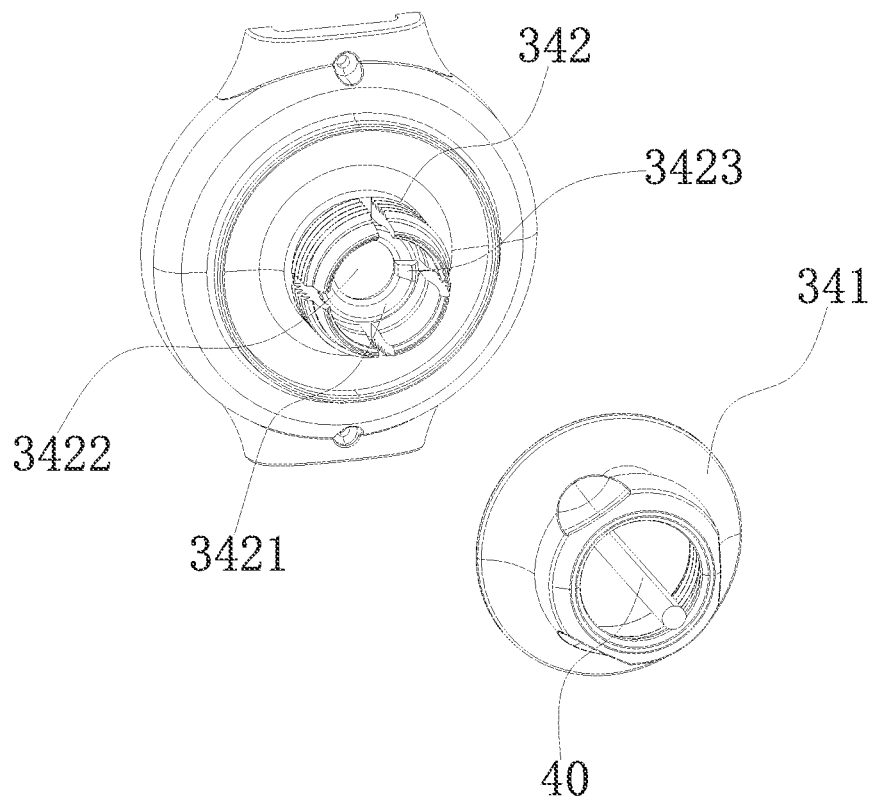
FIG. 4 is an exploded view of the socket of the present invention.

In one embodiment, the socket 34 includes a fastening sleeve 341 and a socket seat 342. The fastening sleeve 341 is provided with internal threads, and the socket seat 342 is provided with external threads, thereby the fastening sleeve 341 can be screwed and fastened on the socket seat 342. As shown in FIG. 3 and FIG. 4, the fastening sleeve 341 has a ring structure, and the internal threads are provided on the inner surface of the ring structure. The socket seat 342 includes a cylindrical wall extending toward the fastening sleeve 341, and the external threads are provided on the outer surface of the cylindrical wall. The socket seat 342 further includes a cavity 3421 nearby the bottom of the cylindrical wall for accommodating the ball body 321. An opening 3422 is formed at the bottom of the cavity 3421 to communicate with the internal space of the supporting component 10. As shown in FIG. 4, the cylindrical wall includes at least four pieces of arc plates with threaded sections thereon, and the arc plates are made of elastic materials.

Figure 5:
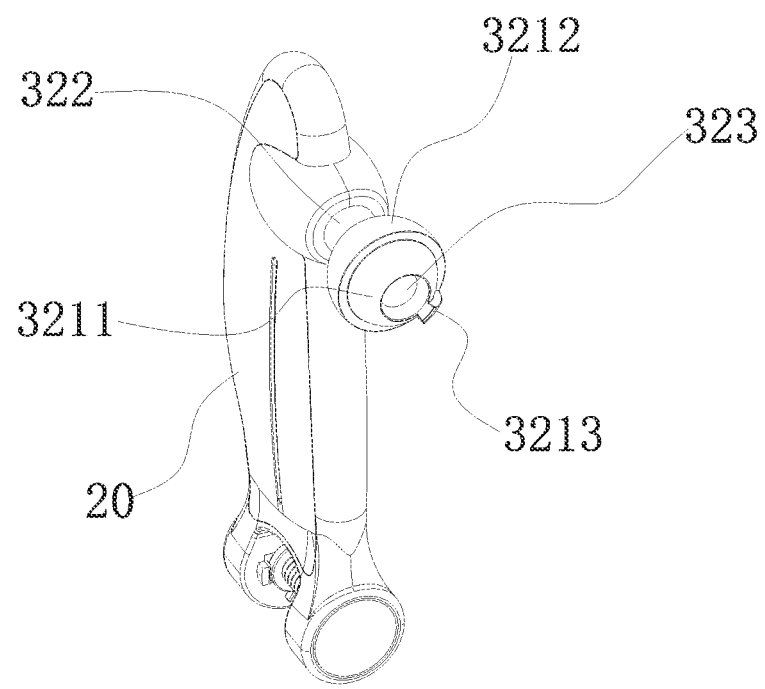
FIG. 5 is a schematic diagram of the combination of the supporting component and the steering joint of the present invention.

Please refer to FIG. 3, FIG. 4 and FIG. 5. In one embodiment, the ball body 321 is composed of two hemispheres with different diameters, including a front hemisphere 3211 and a rear hemisphere 3212. The rear hemisphere 3212 is directly connected to the shaft 322, and the front hemisphere 3211 is far away from the shaft 322 and facing the cavity 3421 of the socket 342. The diameter of the rear hemisphere 3212 is larger than the diameter of the front hemisphere 3211, so that there is a stepped height difference at the junction between the rear hemisphere 3212 and the front hemisphere 3211.

In one embodiment, the ball body 321 has a limiting member 3213 on the spherical surface of the front hemisphere 3211. The socket seat 342 has a protrusion 3423 on the inner surface of the cavity 3421, which cooperates with the limiting member 3213 to limit the rotation range of the socket 34 relative to the ball body 321. That is, when the socket 34 is rotated in one direction continuously, the limiting member 3213 on the ball body 321 would obstruct the protrusion 3423 on the inner surface of the cavity 3421 to limit the rotation of the socket 34. Then the socket 34 can only be rotated in the opposite direction or other directions. This arrangement can prevent the conductive circuit 40 from being over-twisted when the socket 34 is rotated in one direction too much, which could affect the power supply performance of the charging circuit and the charging effect of the mobile terminal.

It should be noted that the rotation of the socket 34 can have the fixing component 10 face in different angles and directions, so that the mobile terminal fixed on the fixing component 10 can be adjusted in the proper angle or direction required by the user. However, since the conductive circuit 40 is also provided through and between the socket 34 and the ball body 321 to provide power to the wireless charging module 12, the above-mentioned protrusion 3423 and the limiting member 3213 are used for restricting the rotation range of the socket 34 in order to avoid excessive rotation of the socket 34 in one direction, which would excessively twist and damage the conductive circuit 40.

Figure 6:
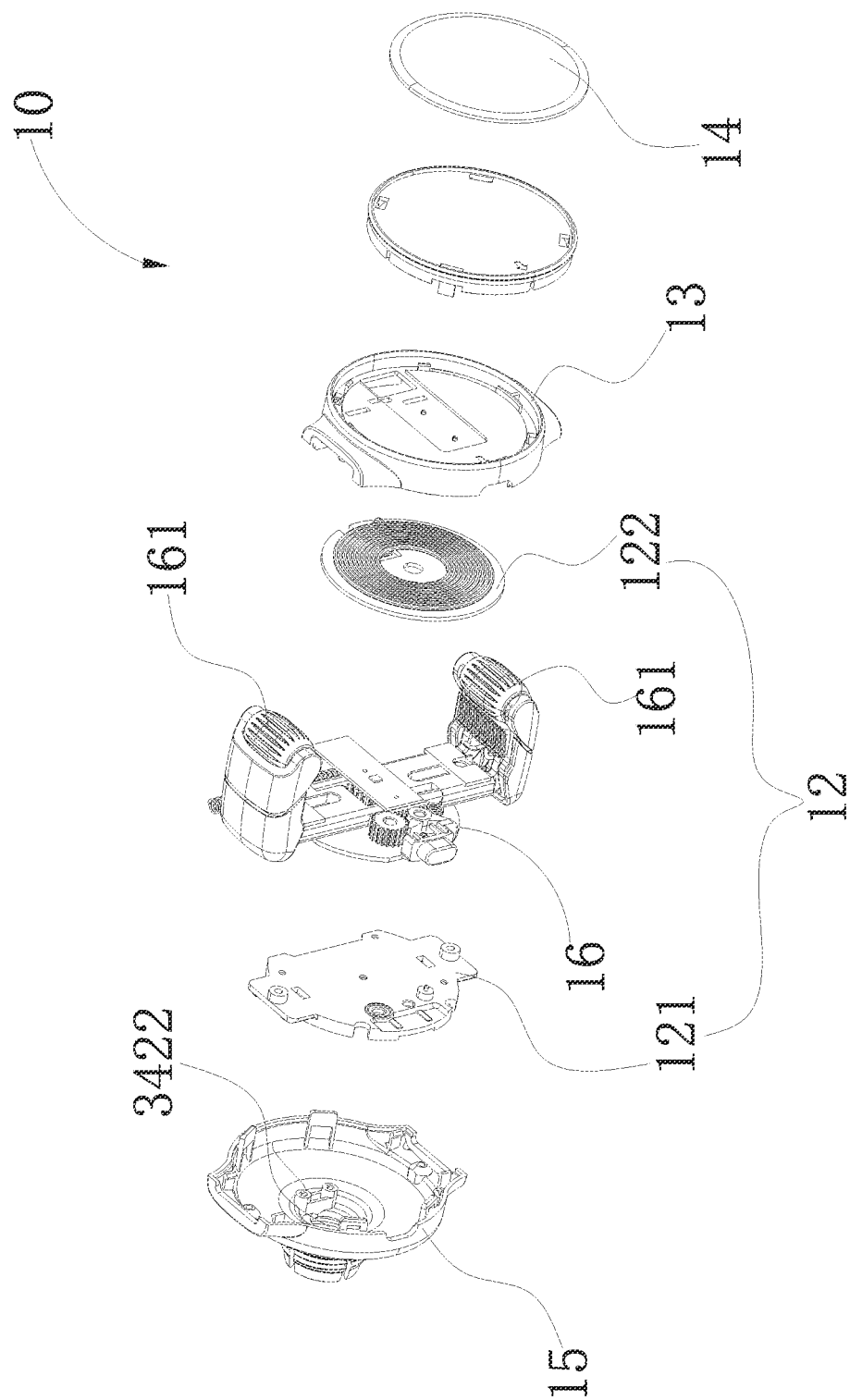
FIG. 6 is an exploded view of the fixing component of the present invention.

Referring to FIG. 6, in one embodiment, the fixing component 10 includes a front housing 13 and a rear housing 15 that can be assembled together to accommodate the above-mentioned circuit board 121 and charging disk 122. It should be particularly noted that the side of the socket seat 342 close to the cavity 3421 is directly connected and fixed to the rear housing 15 so that the opening 3422 at the bottom of the cavity 3421 is directly communicating to the inner space of the fixing component 10. In one embodiment, the socket 342 and the rear housing 15 can also be manufactured in one piece.

In one embodiment, the fixing component 10 further includes a clamping portion 16 for clamping and fixing the mobile terminal. As shown in the figures, the clamping portion 16 includes an upright plate structure and clamping members 161 extending laterally at the upper and lower ends of the plate structure. The plate structure is fixed in the internal space between the front housing 13 and the rear housing 15. The two clamping members 161 protrude respectively from the upper and lower sides of the front housing 13 and the rear housing 15 for holding the mobile terminal. In one embodiment, the clamping members 161 include a small roller with a concave-convex pattern and has certain elasticity.

The clamping portion 16, the circuit board 121 and the charging disk 122 are fixed between the front housing 13 and the rear housing 15 of the fixing component 10. In addition, the fixing component 10 may further include a plastic housing and a bearing pad 14 sequentially arranged on the outer surface of the front housing 13. The bearing pad 14 is provided on the outer surface of the fixing component 10 for loading the mobile terminal. The bearing pad 14 can be a soft pad with anti-slip function, a wood grain sticker, or a plastic board.

Please refer to FIG. 2, in one embodiment, the supporting component 20 further includes a transmission interface 22 provided inside the supporting component 20. One end of the conductive circuit 40 extends into the supporting component 20 and is connected to the transmission interface 22. Through the transmission interface 22 the conductive circuit 40 can be connected to an external power source (not shown in the figures) for supplying electrical power to the wireless charging module 12. In one embodiment, the transmission interface 22 can be used to transmit electrical power at least. The transmission interface 22 can be a USB interface, a Type-C interface, a Lighting interface, or a 12-volt cigarette lighter interface. As shown in the figure, a slot 24 is formed on the housing of the supporting component 20 to facilitate the connection of an external charging line and the transmission interface 22.

In another embodiment, if the transmission interface 22 is not provided inside the supporting component 20, a hole can be formed on the housing of the supporting component 20 so that one end of the conductive circuit 40 can pass through the hole on the housing of the supporting component 20 to connect to an external power source to provide power to the wireless charging module 12.

The wireless charging holder 1 for vehicles may further include a suction base 50, which is connected to the supporting component 20 through a pivoting member 51, so that the supporting component 20 can be rotated relative to the suction base 50. With the pivotal connection between the supporting component 20 and the suction base 50, the fixing component 10 has a larger range of movement. As the embodiment shown in the figure, the pivoting member 51 is fixed to the fixing hole on the supporting component 20 by a screw, and then a cover is disposed on the hole. In other words, the suction base 50 is fastened with the pivoting member 51 via a screw. In one embodiment, the suction base 50 has a suction cup that can be sucked to a fixed device or a movable device in the vehicle. The suction cup can be a plastic vacuum suction cup or a magnetic suction cup.

Figure 7:
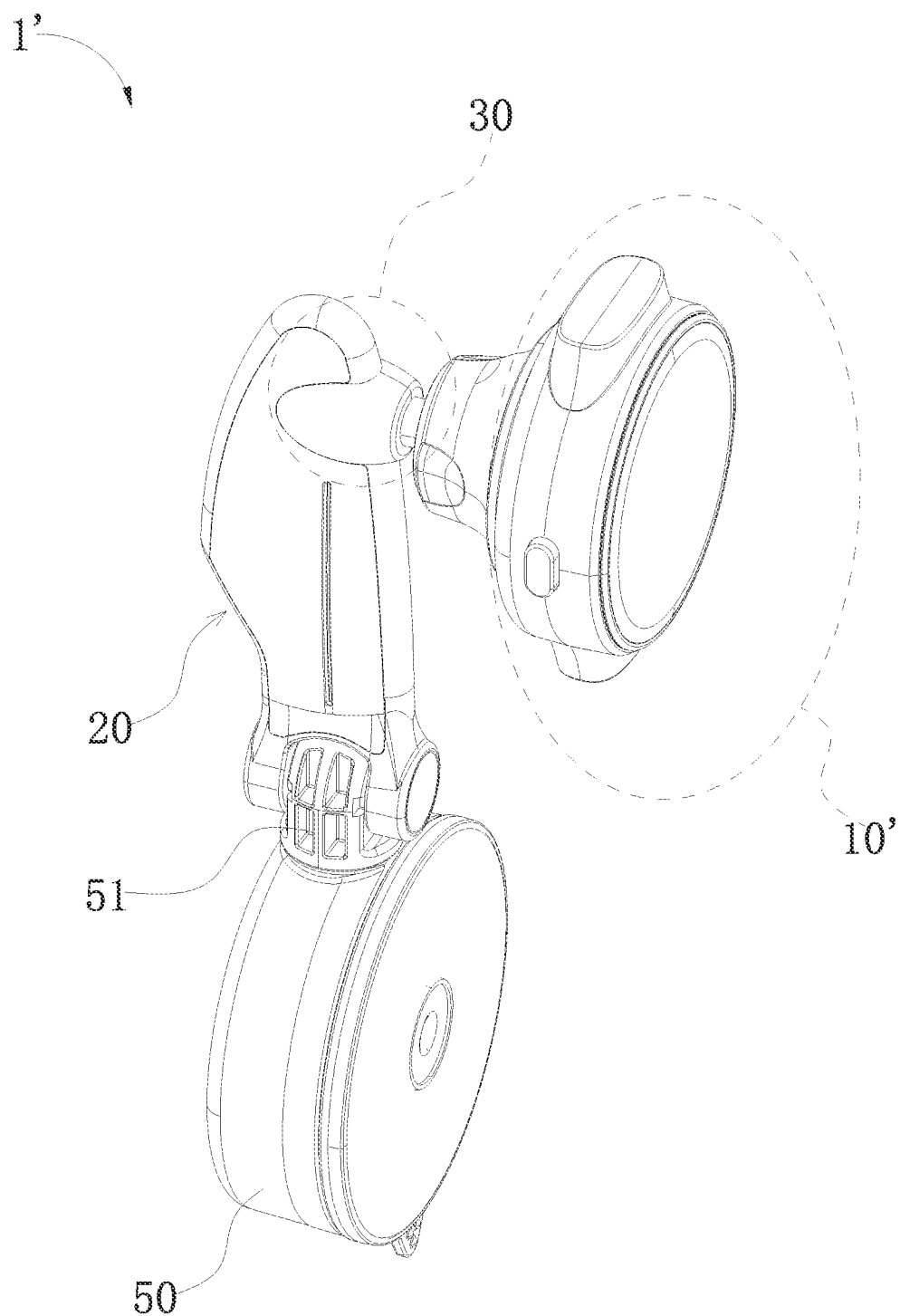
FIG. 7 is a schematic diagram of another embodiment of the wireless charging holder for vehicles of the present invention.

Please refer to FIG. 7 and FIG. 6, in another embodiment provided by the present invention, the fixing component 10' of the wireless charging holder 1' for vehicles is a magnetic fixing component, which is applied to fix the mobile terminal by magnetic adsorption. In other words, the clamping portion 16 can be replaced or matched by magnetic attraction to fix the mobile terminal. A magnetic attraction component can be arranged in the fixing component 10'. For example, the magnetic attraction component is arranged between the bearing pad 14 and the front housing 13, or between the front housing 13 and the rear housing 15. In this way, a mobile terminal with a magnetic attraction function can be held for wireless charging.

The wireless charging holder 1 for vehicles provided by the present invention can firmly hold and wirelessly charge a mobile terminal. In particular, because the conductive circuit 40 is extending sequentially through the inner spaces of the supporting component 20, the steering joint 30 and the fixing component 10 to connect with the wireless charging module 12, it is not necessary to provide a power transmission interface on the housing of the fixing component 10 for connecting an external charging cable. In this way, when the mobile terminal is charged, the user can still adjust the direction or angle of the mobile terminal at will, and the problem of the charging cable being entangled or covering the screen of the mobile terminal can be completely avoided.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. A wireless charging holder for vehicles, comprising:
   a fixing component for fixing a mobile terminal, wherein the fixing component includes a wireless charging module for charging the mobile terminal;
   a supporting component for supporting the fixing component;
   a steering joint connected between the fixing component and the supporting component, thereby the fixing component may be rotated relative to the supporting component; and
   a conductive circuit extending from an inside of the supporting component through an inside of the steering joint and into an inside of the fixing component, to connect with the wireless charging module;
   And the steering joint has a through hole which communicate with the inside of the supporting component,
   And the steering joint has a protrusion disposed to limit the fixing component relative to the range of supporting component rotation.

2. The wireless charging holder for vehicles according to claim 1, wherein the steering joint includes a ball-end shaft and a socket.

3. The wireless charging holder for vehicles according to claim 2, wherein the ball-end shaft includes a ball body and a shaft, one end of the shaft is connected to the ball body, and the other end of the shaft is connected and fixed to the supporting component.

4. The wireless charging holder for vehicles according to claim 3, wherein the socket has a cavity for accommodating the ball body and an opening is formed at a bottom of the cavity for communicating with the inside of the fixing component.

5. The wireless charging holder for vehicles according to claim 2, wherein the fixing component is a magnetic fixing component for fixing the mobile terminal by magnetic attraction.

6. The wireless charging holder for vehicles according to claim 2, wherein the fixing component includes a clamping portion, and two ends of the clamping portion are respectively provided with a clamping member for clamping and fixing the mobile terminal.

7. The wireless charging holder for vehicles according to claim 1, wherein the supporting component has a transmission interface disposed in the inside thereof, one end of the conductive circuit is connected to the transmission interface and is connected to an external power source through the transmission interface.

8. The wireless charging holder for vehicles according to claim 7, wherein the transmission interface may be used to transmit power at least, and the transmission interface can be a USB interface, a Type-C interface, a lighting interface or a cigarette lighter interface.

9. The wireless charging holder for vehicles according to claim 1, wherein a housing of the supporting component has a hole, and one end of the conductive circuit extends in the supporting component and passes through the hole to connect to an external power source.

10. The wireless charging holder for vehicles according to claim 1, further comprising a suction base, which is connected to the supporting component through a pivoting member, thereby the supporting component can rotate relative to the suction base.

* * * * *